US012639178B2

(12) United States Patent
Hicks et al.

(10) Patent No.: US 12,639,178 B2
(45) Date of Patent: May 26, 2026

(54) SUSTAINABLE RAS BALANCING BASED ON PREDICTIVE MODELS

(71) Applicant: INTERNATIONAL BUSINESS MACHINES CORPORATION, Armonk, NY (US)

(72) Inventors: Andrew C. M. Hicks, Highland, NY (US); Michael E Gildein, Wappingers Falls, NY (US); Michael Terrence Cohoon, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/750,481

(22) Filed: Jun. 21, 2024

(65) Prior Publication Data

US 2025/0390400 A1     Dec. 25, 2025

(51) Int. Cl.
| | |
|---|---|
| *G06F 11/00* | (2006.01) |
| *G06F 11/1446* | (2026.01) |
| *G06F 11/20* | (2006.01) |
| *G06F 11/34* | (2006.01) |

(52) U.S. Cl.
CPC ...... *G06F 11/2023* (2013.01); *G06F 11/1451* (2013.01); *G06F 11/3447* (2013.01)

(58) Field of Classification Search
CPC .............. G06F 11/008; G06F 11/0793; G06F 11/1461; G06F 11/142; G06F 11/1423; G06F 11/1425; G06F 11/1446; G06F 11/2023; G06F 11/2028; G06F 11/2038; G06F 11/2041; G06F 11/2007
See application file for complete search history.

(56) References Cited

U.S. PATENT DOCUMENTS

| | | | |
|---|---|---|---|
| 4,062,351 | A | 12/1977 | Hastwell |
| 7,313,087 | B2 | 12/2007 | Patil et al. |
| 9,245,116 | B2 | 1/2016 | Evans et al. |
| 10,257,100 | B2 | 4/2019 | Zhang et al. |
| 10,505,853 | B2 | 12/2019 | Zhang et al. |
| 10,560,439 | B2 | 2/2020 | Seetharam et al. |
| 10,666,497 | B2 | 5/2020 | Tahhan et al. |
| 11,188,432 | B2 | 11/2021 | Yurzola et al. |
| 11,310,276 | B2 | 4/2022 | Hiebert et al. |

(Continued)

FOREIGN PATENT DOCUMENTS

| | | |
|---|---|---|
| EP | 2237479 A1 | 10/2010 |
| EP | 3361848 A1 | 8/2018 |

(Continued)

OTHER PUBLICATIONS

Yang, Renyu et al., Reliable Computing Service in Massive-Scale Systems through Rapid Low-Cost Failover, 2016, IEEE (Year: 2016).*

(Continued)

*Primary Examiner* — Marc Duncan
(74) *Attorney, Agent, or Firm* — Onyx IP Group

(57) ABSTRACT

Methods, systems, and products for sustainable Reliability, Availability, and Serviceability (RAS) balancing based on predictive models includes predicting, based on one or more predictive models, a potential failure within a computing system, and provisioning, based on the potential failure, one or more redundant resources for failover.

20 Claims, 4 Drawing Sheets

(56)　　　　　　References Cited

U.S. PATENT DOCUMENTS

| | | | |
|---|---|---|---|
| 11,625,294 B2 | 4/2023 | Bramble | |
| 11,656,961 B2 | 5/2023 | Yurzola et al. | |
| 11,815,994 B2 | 11/2023 | Bramble | |
| 2013/0024720 A1* | 1/2013 | Aggarwal | G06F 11/2028 |
| | | | 714/E11.073 |
| 2017/0116091 A1* | 4/2017 | Anderson | H04L 41/0668 |
| 2019/0068467 A1* | 2/2019 | Chauhan | G06F 11/3452 |
| 2019/0306007 A1 | 10/2019 | Natarajan et al. | |
| 2021/0042180 A1* | 2/2021 | Sutton | H02J 7/0042 |
| 2021/0241180 A1* | 8/2021 | Vishwakarma | G06F 11/008 |
| 2021/0271578 A1 | 9/2021 | Yurzola et al. | |
| 2021/0406140 A1* | 12/2021 | Sethi | G06F 11/3476 |
| 2023/0325272 A1 | 10/2023 | Golden et al. | |
| 2024/0385930 A1* | 11/2024 | Sethi | G06F 11/1469 |
| 2025/0117300 A1* | 4/2025 | Fitzpatrick | G06F 9/5072 |
| 2025/0362663 A1* | 11/2025 | Anthony | G06Q 10/20 |

FOREIGN PATENT DOCUMENTS

| | | |
|---|---|---|
| EP | 3724846 A1 | 10/2020 |
| EP | 3102902 B1 | 6/2023 |
| WO | 2019122493 A1 | 6/2019 |

OTHER PUBLICATIONS

Anonymous, "Methods of Protecting Data with a Resilient Approach to Revert Ransomware Encryption," an IP.com Prior Art Database Technical Disclosure, IP.com No. IPIPCOM000271766D, IP.com Electronic Publication Date: Feb. 7, 2023, 7 pages.

Anonymous, "System and Method for Proactive Determination of Potential Site Failures," an IP.com Prior Art Database Technical Disclosure, IP.com No. IPCOM000258486D, IP.com Electronic Publication Date: May 16, 2019, 4 pages.

Huang et al., "Fast Generation Redispatch Techniques for Automated Remedial Action Schemes," Published in: 20th International Conference on Intelligent System Application to Power Systems (ISAP), New Delhi, India, Date of Conference: Dec. 10-14, 2019, Date Added to IEEE Xplore: Apr. 16, 2020, DOI: 10.1109/ISAP48318. 2019.9065961, 8 pages.

Mukherjee et al., Line Criticality based Dynamic Security Assessment of Power System using Pattern Recognition Approach, Swami Vivekananda University, In Patent Application Serial No. 202331059420, filed Sep. 4, 2023, 31 pages.

Nerc, "Remedial Action Scheme" Definition Development, Background and Frequently Asked Questions, Project 2010-05.2—Special Protection Systems, North American Electric Reliability Corporation, Jun. 2014, chrome-extension://efaidnbmnn-nibpcajpcglclefindmkaj/https://www.nerc.com/pa/Stand/Prjct201005_2SpclPrtctnSstmPhs2/FAQ_RAS_Definition_0604_final.pdf, 10 pages.

Tokopedia et al., "Implementation of Automated Chaos Testing to Improve Service Resiliency," an IP.com Prior Art Database Technical Disclosure, IP.com No. PCOM000269848D, IP.com Electronic Publication Date: May 17, 2022, 8 pages.

WECC, Remedial Action Scheme Design Guide, Relay Work Group, Remedial Action Scheme Review Subcommittee, Jul. 2022, 31 pages.

Zhang et al., "Remedial Action Schemes and Defense Systems," Smart Grid Handbook, DOI: 10.1002/9781118755471.sgd032, published Aug. 23, 2016, 11 pages.

* cited by examiner

200

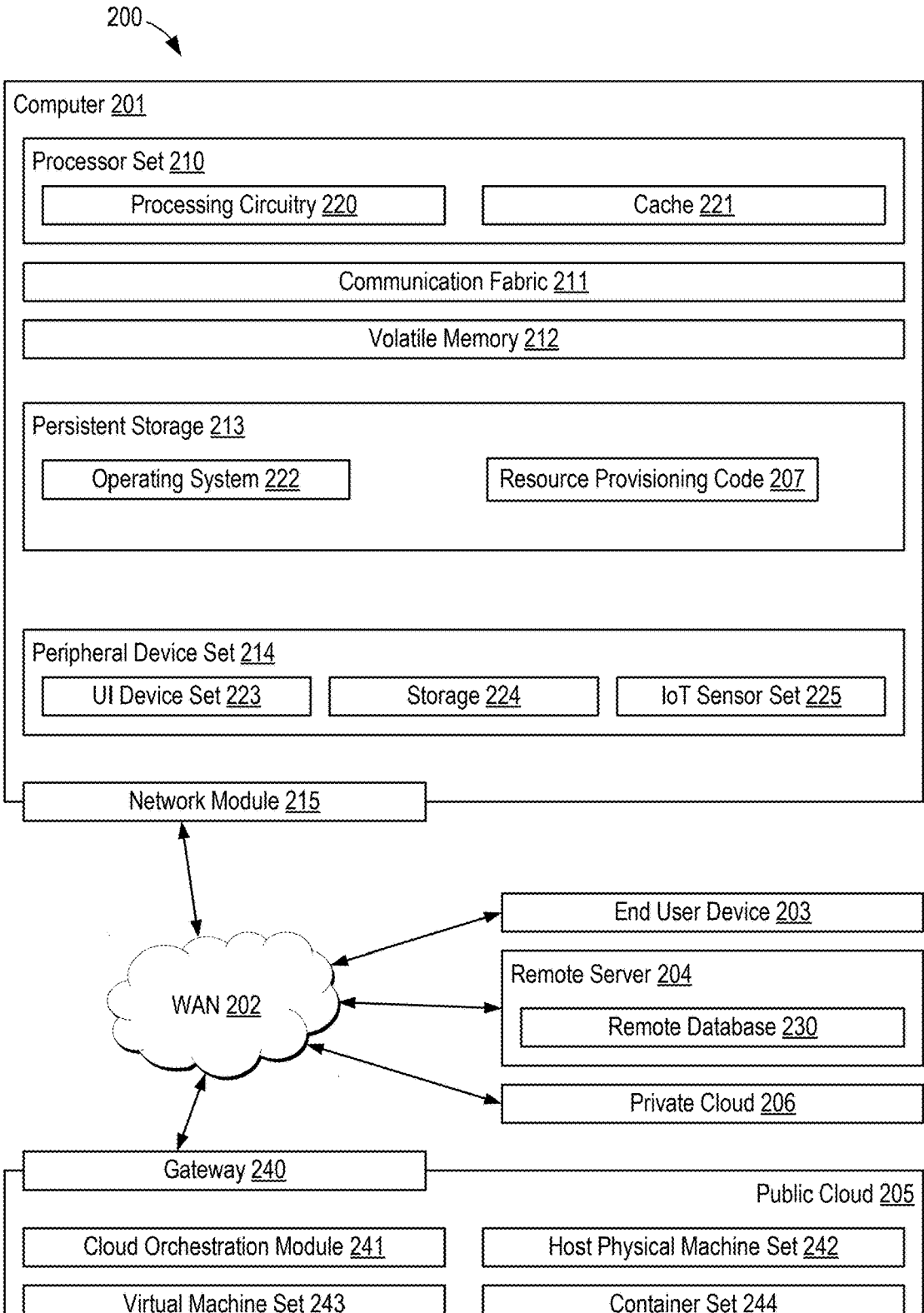

Computer 201

Processor Set 210

Processing Circuitry 220 | Cache 221

Communication Fabric 211

Volatile Memory 212

Persistent Storage 213

Operating System 222 | Resource Provisioning Code 207

Peripheral Device Set 214

UI Device Set 223 | Storage 224 | IoT Sensor Set 225

Network Module 215

WAN 202

End User Device 203

Remote Server 204

Remote Database 230

Private Cloud 206

Gateway 240

Public Cloud 205

Cloud Orchestration Module 241 | Host Physical Machine Set 242

Virtual Machine Set 243 | Container Set 244

FIG. 2

SUSTAINABLE RAS BALANCING BASED ON PREDICTIVE MODELS

BACKGROUND

Field of the Disclosure

The field of the disclosure is data processing, or, more specifically, methods, systems, and products for sustainable RAS (reliability, availability, and serviceability) balancing based on predictive models.

Description of Related Art

Resources, such as backup or redundant resources, may be provisioned or deprovisioned for a computer system. When a system is running with redundancy and backups, a failure with one component will likely not cause the entire system to experience a failure. Such a setup promotes reliability, availability, and serviceability (RAS), with increased electrical consumption as one tradeoff. When a system in a sustainability mode is running, it will run in a slimmed down configuration (with less backups/redundancy resources provisioned to the system) and occupy a smaller resource consumption footprint (less power consumption). However, such a reduced resource consumption comes at the cost of being susceptible to having the entire computer system fail should a problem with a component occur.

SUMMARY

Methods, apparatus, and systems for sustainable RAS balancing based on predictive models according to various embodiments are disclosed in this specification. In accordance with one aspect of the present disclosure, a method of sustainable RAS balancing based on predictive models includes predicting, based on a predictive model, a potential failure within a computing system, and provisioning, based on the potential failure, one or more redundant resources for failover.

In accordance with another aspect of the present disclosure, a system for sustainable RAS balancing based on predictive models may include a computing system, multiple redundant resources, and a processor configured to: predict, based on a predictive model, a potential failure within the computing system, and provision, based on the potential failure, one or more redundant resources for failover.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

BRIEF DESCRIPTION OF THE DRAWINGS

FIG. 2 is a block diagram of an example computing environment configured for sustainable RAS balancing based on predictive models according to some embodiments of the present disclosure.

DETAILED DESCRIPTION

Figure 1:
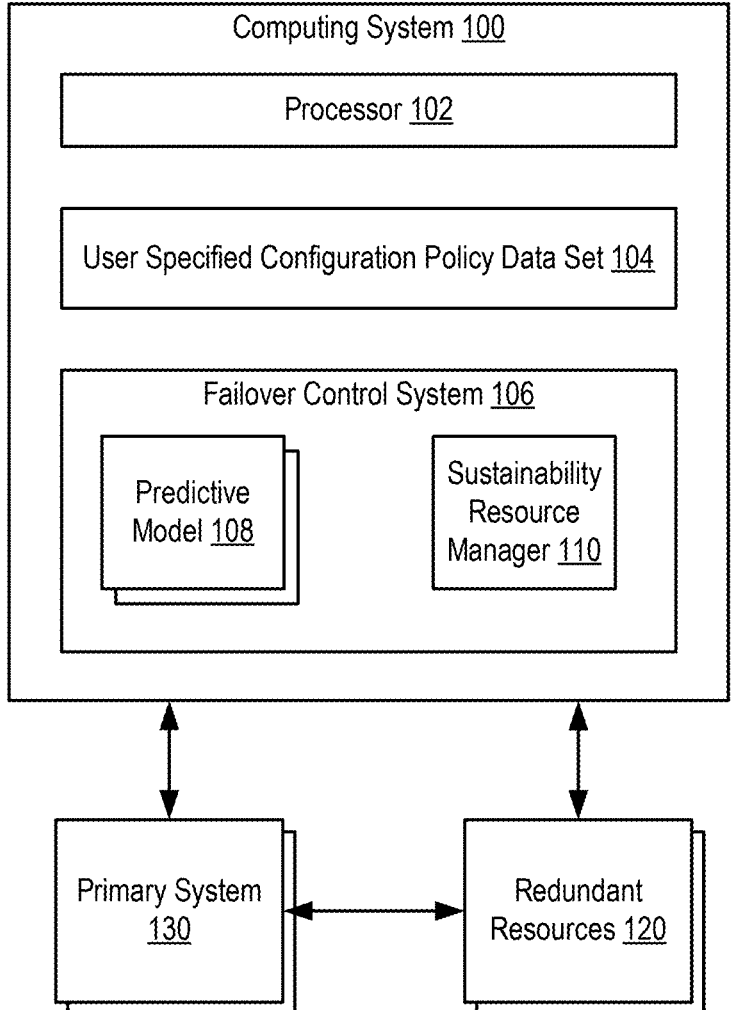
FIG. 1 shows an example line drawing of a system configured for sustainable RAS balancing based on predictive models in accordance with embodiments of the present disclosure.

In accordance with one aspect of the present disclosure, a method of sustainable RAS balancing based on predictive models includes predicting, based on a predictive model, a potential failure within a computing system, and provisioning, based on the potential failure, one or more redundant resources for failover. Such an embodiment allows for increased system reliability and availability without sacrificing sustainability.

In another embodiment, the one or more redundant resources provisioned are selected based on a type of the potential failure. Such an embodiment provides customized resource provisioning and only when required to prevent a failure.

In another embodiment, the one or more redundant resources provisioned are selected based on a predicted time of the potential failure and on a predicted time for provisioning the one or more redundant resources. Such an embodiment provides failure-specific resource provisioning and provides that resources are provisioned that will meet the timing of the predicted failure.

In another embodiment, the predicted time of the potential failure is determined based on the predictive model, including monitoring one or more system variables. Such an embodiment provides for determining how much time to provision resources the computing system has before experiencing the failure, which in turn allows for the proper resources to be provisioned.

In another embodiment, the predicted time for provisioning the one or more redundant resources is determined based on the predictive model, including monitoring one or more system variables. Such an embodiment provides for determining how much time it takes to provision each backup resource to the computing system, which in turn allows for the proper resources to be provisioned in time before the failure occurs.

In another embodiment, the potential failure comprises a component failure of a component included within the computing system.

In another embodiment, the potential failure comprises a system-wide failure of the computing system as a whole.

In another embodiment, the method further includes, after a period of time has passed after provisioning the one or more redundant resources, deprovisioning the one or more redundant resources. Such an embodiment provides increased system efficiency and sustainability by provisioning the redundant resources only when needed to overcome a failure and then deprovisioning them once they are no longer needed.

In another embodiment, deprovisioning the one or more redundant resources includes, if a failure occurs during the period of time, deprovisioning only the one or more redundant resources that are not required responsive to the failure. Such an embodiment provides increased system availability without sacrificing sustainability by deprovisioning any unneeded redundant resources after the failure but maintaining the redundant resources required by the system.

In another embodiment, predicting the potential failure includes performing machine learning.

In another embodiment, predicting the potential failure is based on one or more artificial-intelligence models.

In another embodiment, the method further includes, if a failure is detected, predicting whether a system-wide failure affecting the computing system will occur; and provisioning a complete backup system for failover of the computing system. Such an embodiment provides for increased availability and reliability by allowing for the provisioning of full backup systems when a predicted system-wide failure may occur.

In accordance with another aspect of the present disclosure, a computer program product comprising a computer readable storage medium and computer program instructions stored therein that, when executed, are configured to: predict, based on a predictive model, a potential failure within a computing system; and provision, based on the potential failure, one or more redundant resources for failover. Such an embodiment allows for increased system reliability and availability without sacrificing sustainability.

In accordance with another aspect of the present disclosure, a system for sustainable RAS balancing based on predictive models includes a computing system, multiple redundant resources, and a processor configured to: predict, based on a predictive model, a potential failure within the computing system, and provision, based on the potential failure, one or more redundant resources for failover. Such an embodiment allows for increased system reliability and availability without sacrificing sustainability.

In another embodiment, the multiple redundant resources include one or more of: duplicate paths to a destination target, replicated storage, RAID storage, redundant componentry, and software monitors.

Exemplary methods, systems, and products for sustainable RAS balancing based on predictive models in accordance with the present disclosure are described with reference to the accompanying drawings, beginning with FIG. 1. FIG. 1 sets forth an example line drawing of a system configured for sustainable RAS balancing based on predictive models in accordance with embodiments of the present disclosure. The example of FIG. 1 includes a computing system 100, one or more primary systems (such as primary system 130), and redundant resources 120.

The example computing system 100 of FIG. 1 includes a processor 102, user specified configuration policy data set 104, and failover control system 106. The example failover control system 106 of the computing system includes one or more predictive models (such as predictive model 108) and sustainability resource manager 110. The computing system 100 is configured to have one or more redundant resources (such as from redundant resources 120) provisioned to it for redundancy and failure recovery. In other embodiments, the computing system is configured to provision one or more redundant resources 120 to other systems (such as primary system 130) in case those systems experience failures or need additional redundancy. The example redundant resources 120 of FIG. 1 may include one or more of redundant components and redundant systems. Redundant resources 120 may include one or more of: duplicate paths to a destination target, replicated storage, RAID storage, redundant componentry, and software monitors. For example, if a primary system 130 experiences a failure at one of its components, the failing component may failover to a provisioned redundant component of the redundant resources 120 to overcome the component-level failure. In such an example, the computing system is configured to overcome failures and prevent system-wide failure using redundant resources provisioned to the computing system.

In another example, if a primary system 130 (or computing system 100) experiences a system-wide failure, the failing system may failover to a provisioned redundant system of the redundant resources 120 to overcome the system-wide failure. In such an example, the computing system is configured to overcome system-wide failure using redundant resources provisioned to the failing computing system.

A computing system running in a high-availability mode is provisioned with multiple redundant resources from the pool of redundant resources 120, and thus operates with increased reliability, availability, and serviceability (RAS), with increased electrical consumption as a tradeoff. However, a computing system running in a sustainability mode runs in a slimmed down configuration (with less backups/ redundancy resources provisioned to the system) and therefore occupies a smaller resource consumption footprint (less power consumption) when compared with the computing system operating at the high-availability mode. However, such a reduced resource consumption comes at the cost of being susceptible to having the entire computing system fail, even from a component-level failure. Accordingly, the embodiments of the present disclosure describe methods for rapidly provisioning redundant resources to computing systems that are running in a sustainability mode (with less redundant resources) and that are experiencing a failure or are predicted to experience a failure. By rapidly provisioning one or more redundant resources 120 to a computing system that is likely to experience a failure, the failure can be avoided or overcome (and prevent a system-wide failure) without keeping multiple redundant resources provisioned to the system at all times (thus saving power consumption).

Computing system 100 is configured to predict, based on one or more predictive models, a potential failure within a computing system. The computing system 100 is also configured to provision, based on the predicted potential failure, one or more redundant resources to the computing system for failover (if the potential failure occurs). In one embodiment, the prediction of failure and the provisioning of redundant resources are performed by the processor 102 of the computing system 100. In another embodiment, the prediction of the failure and the provisioning of the redundant resources are performed by failover control system 106 (via the one or more predictive models and the sustainability resource manager 110). In the example embodiment of FIG. 1, the failover control system 106 is included within the computing system. In other embodiments, the failover control system 106 may be in a remote system and coupled to computing system 100. The failover control system 106 may be hardware, software, or a combination of hardware and software. The failover control system 106 may be a virtual system included within, or coupled to, computing system 100. The predictive models 108 may include machine learning models, artificial intelligence models, or a combination of both. The provisioning of redundant resources 120 to systems may be carried out based on a user specified configuration policy data set 104, which includes a user defined policy for when and how to provision redundant resources for maximizing sustainability while preventing and overcoming failures.

In other embodiments, the redundant resources include software resources, such as virtual systems or components, and may be provisioned to the computing system 100 or computing systems 130 for failover. The failover control system 106 is configured to carry out a series of actions responsive to predictive analysis (e.g., running one or more predictive models 108).

For further explanation, FIG. 2 sets forth a block diagram of computing environment 200 configured for sustainable RAS balancing based on predictive models in accordance with embodiments of the present disclosure. Computing environment 200 contains an example of an environment for the execution of at least some of the computer code involved in performing the inventive methods, such as resource provisioning code 207. In addition to resource provisioning code 207, computing environment 200 includes, for example, computer 201, wide area network (WAN) 202, end user device (EUD) 203, remote server 204, public cloud 205, and private cloud 206. In this example embodiment, computer 201 is computing system 100 of FIG. 1, and includes processor set 210 (including processing circuitry 220 and cache 221), communication fabric 211, volatile memory 212, persistent storage 213 (including operating system 222 and resource provisioning code 207, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in resource provisioning code 207 in persistent storage 213.

Communication fabric 211 is the signal conduction path that allows the various components of computer 201 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface-type operating systems that employ a kernel. The code included in resource provisioning code 207 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215. Network module 215 may be configured to communicate with other systems or devices, such as sensors 225, for receiving sensor measurements.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
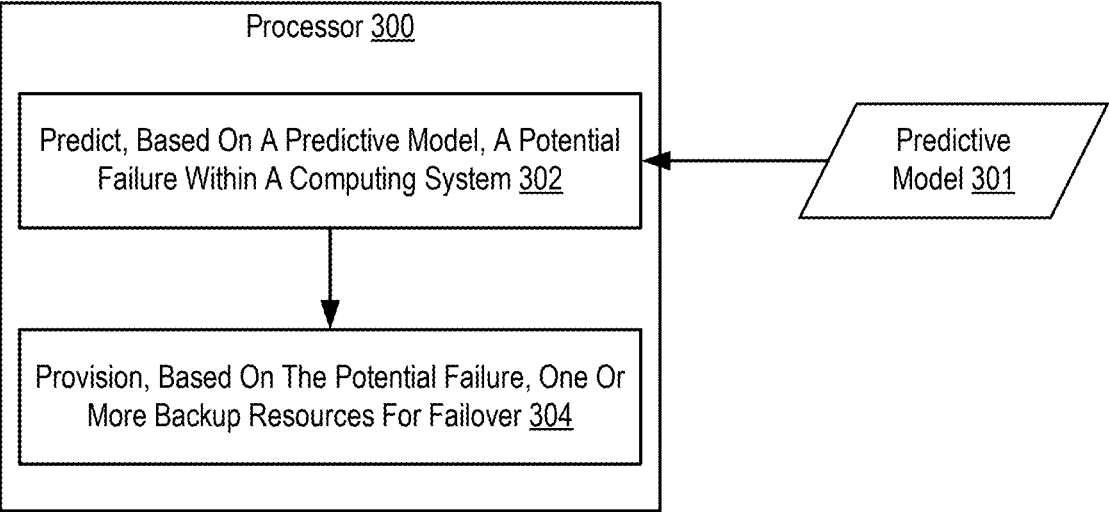
FIG. 3 is a flowchart of an example method for sustainable RAS balancing based on predictive models according to some embodiments of the present disclosure.

For further explanation, FIG. 3 sets forth a flow chart illustrating an exemplary method of sustainable RAS balancing based on predictive models according to embodiments of the present disclosure. The method of FIG. 3 includes predicting 302, based on a predictive model, a potential failure within a computing system. Predicting 302 a potential failure within a computing system may be carried out by a processor (such as processor 300) monitoring one or more predictive models (such as predictive model 301) and determining when a predictive model indicates with a threshold level of confidence that a failure will occur within the computing system. The processor 300 may be a processor included within the computing system that is predicted to experience a failure, or the processor 300 may be included in a separate but communicatively coupled computing system. The one or more predictive models may include an artificial intelligence (AI) model. In one embodiment, predicting a future potential failure includes performing machine learning, such as on system performance and performance history associated with the computing system. The predicted potential failure may be a component-level failure or may be a system-wide failure.

The method of FIG. 3 also includes provisioning 304, based on the potential failure, one or more redundant resources for failover. Provisioning 304 one or more redundant resources for failover may be carried out by a processor (such as processor 300) determining which redundant resources should be provisioned to the computing system to best overcome or prevent the potential failure. The one or more redundant resources are selected for provisioning from a pool of redundant resources (such as redundant resources 120 of FIG. 1). Selecting the one or more redundant resources for provisioning to the computing system may be based on a type of the potential failure. For example, different failure types (such as failures predicted for a particular component or components versus system-wide failures) may require different redundant resources for failover. In one example, processor 300 predicts that the computing system will experience a memory failure at the computing system's RAM. In such an example, the processor may provision the appropriate redundant resources (such as one or more RAM redundancy components) for failover if the potential failure does occur.

In another embodiment, selecting the one or more redundant resources for provisioning to the computing system may be based on a predicted time of the potential failure and on a predicted time for provisioning the one or more redundant resources. For example, different redundant resources may take different amounts of time to be provisioned to the computing system. Further, each computing system may require different amounts of time for provisioning resources. Accordingly, the processor 300 is configured to monitor computing systems and determine, based on a predictive model (and monitoring one or more system variables), how much time the provisioning will take for each specific backup resource and for each computing system. The processor 300 is also configured to determine, based on the predictive model (and monitoring one or more system variables), how much time before the predicted potential failure will occur. By taking into account both the predicted time of the potential failure and the predicted time for provisioning the one or more redundant resources, the processor may select (for provisioning) only the redundant resources which will be able to be provisioned in time before the potential failure occurs.

Figure 4:
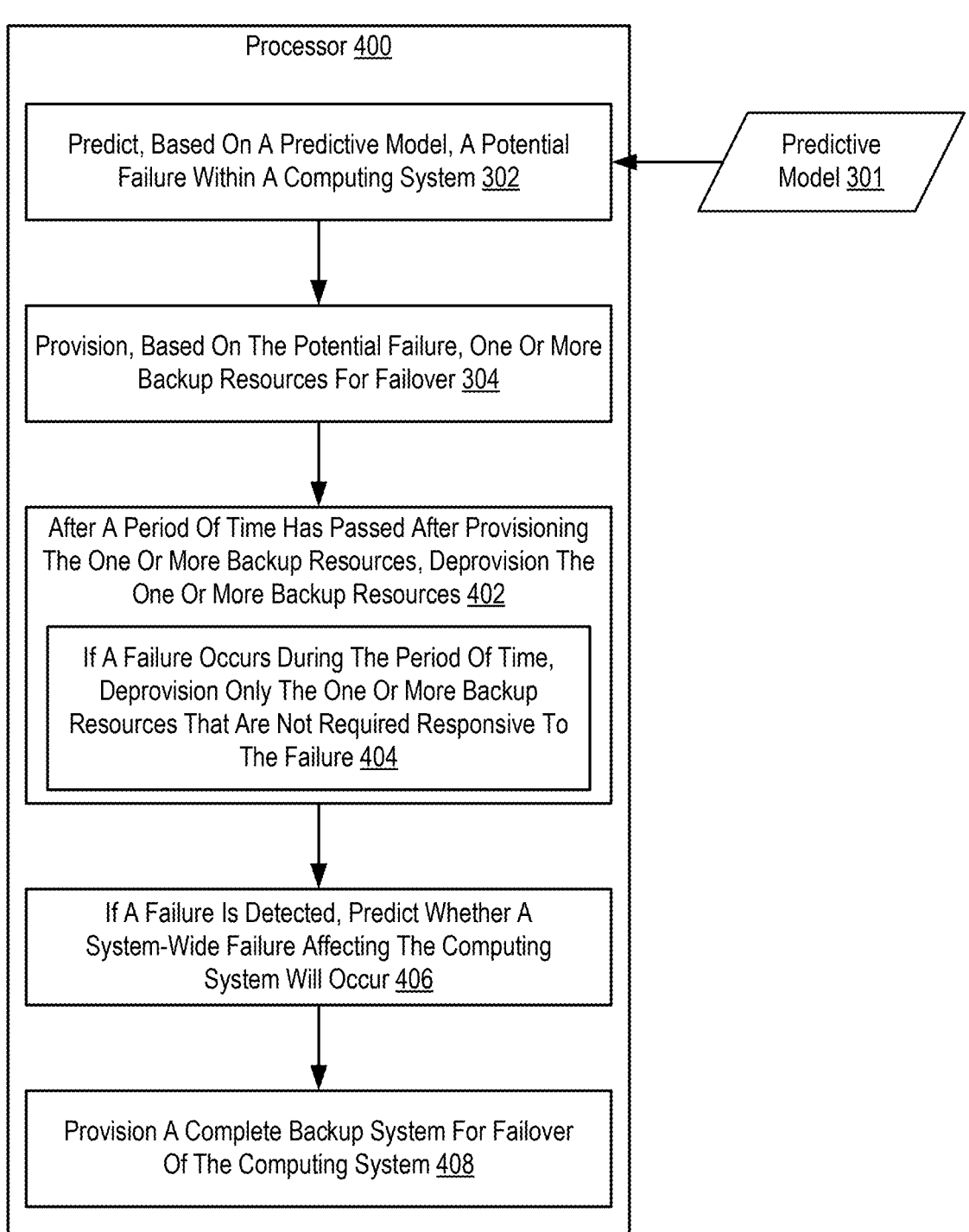
FIG. 4 is a flowchart of another example method for sustainable RAS balancing based on predictive models according to some embodiments of the present disclosure.

For further explanation, FIG. 4 sets forth a flow chart illustrating another exemplary method of sustainable RAS balancing based on predictive models according to embodiments of the present disclosure. The method of FIG. 4 differs from the method of FIG. 3 in that the method of FIG. 4 further includes deprovisioning 402, after a period of time has passed after provisioning the one or more redundant resources, the one or more redundant resources. Deprovisioning 402 the one or more redundant resources may be carried out by a processor (such as processor 400) by making the provisioned redundant resources available again for provisioning to other computing systems after a threshold amount of time has passed since provisioning the redundant resources responsive to the predicted failure. The processor 400 may be a processor included within the computing system that is predicted to experience a failure, or the processor 400 may be included in a separate but communicatively coupled computing system.

The method of FIG. 4 also includes, as part of deprovisioning 402, deprovisioning 404, if a failure occurs during the period of time, only the one or more redundant resources that are not required (by the computing system) responsive to the failure. Deprovisioning 404 only the one or more redundant resources that are not required (by the computing system) responsive to the failure may be carried out by a processor (such as processor 400) by making any unused provisioned redundant resources available again for provisioning to other computing systems after a threshold amount of time has passed since provisioning the redundant resources responsive to the predicted failure, but keeping any redundant resources that were used responsive to an actual failure that occurred provisioned to the computing system.

The method of FIG. 4 also includes, if a failure is detected, predicting 406 whether a system-wide failure affecting the computing system will occur. Predicting 406 whether a system-wide failure affecting the computing system will occur may be carried out by a processor (such as processor 400) by monitoring one or more predictive models (such as predictive model 301) and determining when a predictive model indicates with a threshold level of confidence that a system-wide failure will occur within the computing system. The one or more predictive models may include an artificial intelligence (AI) model. In one embodiment, predicting a system-wide future potential failure includes performing machine learning, such as on system performance and performance history associated with the computing system.

The method of FIG. 4 also includes provisioning 408 a complete backup system for failover of the computing system. Provisioning 408 a complete backup system for failover of the computing system may be carried out by a processor (such as processor 400) determining which backup system (from redundant resources 120 of FIG. 1) should be provisioned to the computing system to best overcome or prevent the system-wide potential failure. Selecting the backup system for provisioning may be carried out much in the same way as selecting redundant resources during the provisioning 304 step, taking into account both the predicted time of the potential system-wide failure and the predicted time for provisioning the complete backup system. Accordingly, the processor may select (for provisioning) only the complete backup system which will be able to be provisioned in time before the potential system-wide failure occurs.

In view of the explanations set forth above, readers will recognize that the benefits of sustainable RAS balancing based on predictive models according to embodiments of the present disclosure include:

Increasing system reliability and availability without sacrificing sustainability.

Increasing system efficiency and sustainability by provisioning the redundant resources only when needed to overcome a failure and then deprovisioning them once they are no longer needed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of sustainable reliability, availability, and serviceability (RAS) balancing based on predictive models, the method comprising:
  predicting, based on one or more predictive models, a potential failure within a computing system;
  determining a predicted time for the potential failure to occur;
  determining predicted times for provisioning different redundant resources, associated with the computing system, to address failures within the computing system;

selecting one or more resources, of the different redundant resources, based on the predicted time for the potential failure to occur and based on one or more predicted times for provisioning the one or more redundant resources to address the potential failure; and
  provisioning, based on the potential failure, the one or more redundant resources for failover.

2. The method of claim 1, wherein the one or more redundant resources provisioned are selected based on a type of the potential failure.

3. The method of claim 1, wherein the predicted time of the potential failure and the predicted times for provisioning the different redundant resources are predicted by the one or more predictive models.

4. The method of claim 3, wherein the predicted time of the potential failure is determined based on the one or more predictive models, including monitoring one or more of: one or more system variables and one or more system metrics.

5. The method of claim 3, wherein the predicted times for provisioning the different redundant resources are determined based on the one or more predictive models, including monitoring one or more of: one or more system variables and one or more system metrics.

6. The method of claim 1, wherein the potential failure comprises a component failure of a component included within the computing system.

7. The method of claim 1, wherein the potential failure comprises a system-wide failure of the computing system as a whole.

8. The method of claim 1, further comprising, after a period of time has passed after provisioning the one or more redundant resources, deprovisioning the one or more redundant resources.

9. The method of claim 8, wherein deprovisioning the one or more redundant resources includes, if a failure occurs during the period of time, deprovisioning only the one or more redundant resources that are not required responsive to the failure.

10. The method of claim 1, wherein predicting the potential failure includes performing machine learning.

11. The method of claim 1, wherein predicting the potential failure is based on one or more artificial-intelligence models.

12. The method of claim 1, further comprising:
  if a failure is detected, predicting whether a system-wide failure affecting the computing system will occur; and
  provisioning a complete backup system for failover of the computing system.

13. A computer program product comprising a computer readable storage medium and computer program instructions stored therein that, when executed, are configured to:
  predict, based on one or more predictive models, a potential failure within a computing system;
  determine a predicted time for the potential failure to occur;
  determine predicted times for provisioning different redundant resources, associated with the computing system, for failover within the computing system;
  select one or more resources, of the different redundant resources, based on the predicted time for the potential failure to occur and based on one or more predicted times for provisioning the one or more redundant resources for failover for the potential failure; and
  provision, based on the potential failure, the one or more redundant resources for failover.

14. The computer program product of claim 13, wherein the predicted time of the potential failure and the predicted times for provisioning the different redundant resources are predicted by the one or more predictive models.

15. The computer program product of claim 14, wherein the predicted time of the potential failure is determined based on the one or more predictive models, including monitoring one or more of: one or more system variables and one or more system metrics.

16. The computer program product of claim 14, wherein the predicted times for provisioning the different redundant resources are determined based on the one or more predictive models, including monitoring one or more of: one or more system variables and one or more system metrics.

17. The computer program product of claim 13, further comprising, after a period of time has passed after provisioning the one or more redundant resources, deprovisioning the one or more redundant resources.

18. The computer program product of claim 17, wherein deprovisioning the one or more redundant resources includes, if a failure occurs during the period of time, deprovisioning only the one or more redundant resources that are not required responsive to the failure.

19. A system comprising:

a computing system;

a plurality of redundant resources; and a processor configured to:

predict, based on one or more predictive models, a potential failure within the computing system;

determine a predicted time for the potential failure to occur;

determine predicted times for provisioning different redundant resources, associated with the computing system, for failover within the computing system, select one or more resources, of the different redundant resources, based on the predicted time for the potential failure to occur and based on one or more predicted times for provisioning the one or more redundant resources for failover for the potential failure; and provision, based on the potential failure, the one or more redundant resources for failover.

20. The system of claim 19, wherein the plurality of redundant resources includes one or more of: duplicate paths to a destination target, replicated storage, RAID storage, redundant componentry, and software monitors.

\* \* \* \* \*